US012630426B2

(12) United States Patent
Hasegawa et al.

(10) Patent No.: US 12,630,426 B2
(45) Date of Patent: *May 19, 2026

(54) MESOPOROUS CARBON AND MANUFACTURING METHOD OF THE SAME, AND POLYMER ELECTROLYTE FUEL CELL

(71) Applicant: TOYOTA JIDOSHA KABUSHIKI KAISHA, Toyota (JP)

(72) Inventors: Naoki Hasegawa, Nagakute (JP); Kazuhisa Yano, Nagakute (JP); Tomohiro Takeshita, Nagakute (JP); Rui Imoto, Yokohama (JP); Kumiko Nomura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

This patent is subject to a terminal disclaimer.

(21) Appl. No.: 18/658,076

(22) Filed: May 8, 2024

(65) Prior Publication Data

US 2024/0286902 A1      Aug. 29, 2024

Related U.S. Application Data

(63) Continuation of application No. 17/105,417, filed on Nov. 25, 2020, now Pat. No. 12,006,216.

(30) Foreign Application Priority Data

Nov. 29, 2019      (JP) ................................. 2019-217524

(51) Int. Cl.
C01B 32/05      (2017.01)
H01M 4/86      (2006.01)
H01M 4/96      (2006.01)

(52) U.S. Cl.
CPC ........... *C01B 32/05* (2017.08); *H01M 4/8605* (2013.01); *H01M 4/96* (2013.01); *C01P 2004/64* (2013.01);
(Continued)

(58) Field of Classification Search
None
See application file for complete search history.

(56) References Cited

U.S. PATENT DOCUMENTS

2005/0129604 A1      6/2005   Pak et al.
2005/0142428 A1      6/2005   Daimon et al.
(Continued)

FOREIGN PATENT DOCUMENTS

CN          105229834 A      1/2016
JP          4471174 B2      3/2010
(Continued)

OTHER PUBLICATIONS

Machine translation of Dai et al., JP 2012527397 A (Year: 2012).*
(Continued)

*Primary Examiner* — Keling Zhang
(74) *Attorney, Agent, or Firm* — Hunton Andrews Kurth LLP

(57)      ABSTRACT

Mesoporous carbon has a beaded structure in which primary particles with mesopores are linked. In the mesoporous carbon, an average primary particle size is 7 nm or more and 300 nm or less, a pore diameter is 2 nm or more and 10 nm or less, an average thickness of pore walls is 3 nm or more and 15 nm or less, a pore volume is 0.2 mL/g or more and 3.0 mL/g or less, and a tap density is 0.03 g/cm³ or more and 0.3 g/cm³ or less. In a polymer electrolyte fuel cell, the mesoporous carbon is used as a catalyst carrier for at least an air electrode catalyst layer. The mesoporous carbon can be obtained by impregnating mesoporous silica satisfying a
(Continued)

predetermined condition with a carbon source, performing polymerization and carbonization, and removing a template.

10 Claims, 8 Drawing Sheets

(52) U.S. Cl.
CPC ...... *C01P 2006/14* (2013.01); *C01P 2006/16* (2013.01); *H01M 2300/0082* (2013.01); *H01M 2300/0085* (2013.01)

(56) References Cited

U.S. PATENT DOCUMENTS

| | | | |
|---|---|---|---|
| 2006/0263288 | A1 | 11/2006 | Pak et al. |
| 2007/0116625 | A1 | 5/2007 | Joo et al. |
| 2009/0098442 | A1 | 4/2009 | Pak et al. |
| 2011/0058308 | A1 | 3/2011 | Nishi et al. |
| 2015/0017555 | A1 | 1/2015 | Schuth et al. |
| 2015/0352522 | A1 | 12/2015 | Mizuuchi et al. |
| 2016/0093892 | A1 | 3/2016 | Hori et al. |
| 2017/0326527 | A1 | 11/2017 | Kume et al. |
| 2018/0301726 | A1 | 10/2018 | Shintani et al. |
| 2021/0163292 | A1 | 6/2021 | Hasegawa et al. |

FOREIGN PATENT DOCUMENTS

| | | | |
|---|---|---|---|
| JP | 2010265125 | A | 11/2010 |
| JP | 4912044 | B2 | 1/2012 |
| JP | 2012527397 | A | 11/2012 |
| JP | 5481748 | B2 | 2/2014 |
| JP | 2015078110 | A | 4/2015 |
| JP | 2016160251 | A | 9/2016 |
| JP | 6042922 | B2 | 11/2016 |
| JP | 6305349 | B2 | 3/2018 |
| JP | 2018174078 | A | 11/2018 |
| JP | 2018181838 | A | 11/2018 |
| JP | 2019169317 | A | 10/2019 |
| WO | 2014129597 | A1 | 8/2014 |

OTHER PUBLICATIONS

Ahamed et al., 2021, Biofuel Cells—Materials and Challenges—14.2.2.3 Direct Methanol Fuel Cell (DMFC) (Year: 2021).

Bagotsky et al., 2015, Electrochemical Power Sources—Batteries, Fuel Cells, and Supercapacitors—18.1 The History of PEMFC (Year: 2015).

Bulk density and tapped density of powders, Stage 6 Harmonization, 2015 (year: 2015).

Su et al., Preparation and characterization of highly graphitic mesoporous carbon as a Pt catalyst support for direct methanol fuel cells, Chem. Mater., 2005, 3960-3967 (Year: 2005).

"Banham, D., et al., "Effect of carbon support nanostructure on the oxygen reduction activity of Pt/C catalysts", Journal of Materials Chemistry A, vol. 1, No. 8, Jan. 1, 2013, pp. 2812-2820, 9 pages."

USPTO, Office Action issued to U.S. Appl. No. 17/105,417 on Feb. 15, 2023.

USPTO, Office Action issued to U.S. Appl. No. 17/105,417 on Oct. 11, 2023.

USPTO, Notice of Allowance issued to U.S. Appl. No. 17/105,417 on Feb. 12, 2024.

\* cited by examiner

FIG. 4

EXAMPLE 1

EXAMPLE 2

AIR ELECTRODE CATALYST LAYER

ELECTROLYTE MEMBRANE

COMPARATIVE EXAMPLE 1

EXAMPLE 3

AIR ELECTRODE CATALYST LAYER

ELECTROLYTE MEMBRANE

MESOPOROUS CARBON AND MANUFACTURING METHOD OF THE SAME, AND POLYMER ELECTROLYTE FUEL CELL

CROSS-REFERENCE TO RELATED APPLICATION

This is a continuation application of U.S. patent application Ser. No. 17/105,417, filed Nov. 25, 2020, which claims priority to Japanese Patent Application No. 2019-217524 filed on Nov. 29, 2019, incorporated herein by reference in its entirety.

BACKGROUND

1. Technical Field

The present disclosure relates to mesoporous carbon and a method for manufacturing the same, and a polymer electrolyte fuel cell. More specifically, the present disclosure relates to a mesoporous carbon having a beaded structure and having an average primary particle size, an average pore diameter, an average thickness of pore walls, a pore volume, and a tap density within their respective predetermined ranges, and a method for manufacturing the mesoporous carbon, and a polymer electrolyte fuel cell using the mesoporous carbon as a catalyst carrier.

2. Description of Related Art

The polymer electrolyte fuel cell includes a membrane electrode assembly (MEA) in which electrodes containing a catalyst are bonded to opposite surfaces of an electrolyte membrane. Each electrode usually has a two-layer structure composed of a catalyst layer containing a catalyst and a diffusion layer. Further, current collectors (separators) provided with gas flow paths are arranged on the opposite surfaces of the MEA. The polymer electrolyte fuel cell usually has a structure in which a plurality of single cells each composed of the MEA and the current collectors are stacked (fuel cell stack).

In a polymer electrolyte fuel cell, the catalyst layer is generally made of a mixture of a catalyst layer ionomer and an electrode catalyst in which catalyst metal fine particles such as platinum are supported on a carrier surface. A carbon material such as carbon black or acetylene black is usually used as the catalyst carrier. Further, it is known that the pore diameter, the specific surface area, and the like of the carbon material used for the catalyst carrier have an effect on the characteristics of the fuel cell. Therefore, various proposals have been made regarding carbon materials having controlled pore diameters, specific surface areas, and the like.

For example, Japanese Patent No. 5481748 (JP 5481748 B) discloses a method for manufacturing a carbon nanostructure. The method includes:
- (a) heating silver acetylide impregnated with methanol at 60° C. to 80° C. for 12 hours or more in a vacuum electric furnace to form metal-encapsulated dendritic nanostructures containing metal silver particles; and
- (b) performing a heat treatment on the metal-encapsulated dendritic nanostructures at 160° C. to 200° C. in the vacuum electric furnace. JP 5481748 B states that this method provides a carbon nanostructure in which ring bodies are bonded to each other to form a network, the ring bodies each having a structure in which carbon particles (graphene parcels) are surrounded by a skin made of graphene.

Japanese Patent No. 6042922 (JP 6042922 B), Japanese Unexamined Patent Application Publication No. 2016-160251 (JP 2016-160251 A), and Japanese Unexamined Patent Application publication No. 2015-078110 (JP 2015-078110 A) disclose methods for producing carbon porous materials. These methods each include:
- (a) heating calcium salt of terephthalic acid at 550° C. or higher and 700° C. or lower to form a composite of carbon and calcium carbonate; and
- (b) dissolving and removing the calcium carbonate from the composite.

JP 6042922 B, JP 2016-160251 A, and JP 2015-078110 A each state that with such a method, a carbon porous material can be obtained that provides a large gas adsorption/desorption amount when the gas pressure is changed within a predetermined range.

Japanese Unexamined Patent Application Publication No. 2018-181838 (JP 2018-181838 A) discloses a method for manufacturing a carbon carrier, which includes pulverizing commercially available mesoporous carbon (CNovel manufactured by Toyo Tanso Co., Ltd., average particle size of 4 m). JP 2018-181838 A states that with such a method, a carbon carrier can be obtained that has a mode radius of mesopores of 3.3 nm to 4.8 nm, a pore volume of mesopores of 1.4 cm³/g to 1.8 cm³/g, and an average particle size of 190 nm to 470 nm.

Japanese Patent No. 4471174 (JP 4471174 B) discloses a method for manufacturing a mesoporous carbon material. The method includes:
- (a) impregnating a precursor mixture composed of phenanthrene, para-toluene sulfuric acid, and acetone with mesoporous silica (SBA-15);
- (b) performing a heat treatment on SBA-15 containing the precursor mixture at 200° C.;
- (c) heating, at a temperature of 900° C., the composite subjected to the heat treatment so as to graphitize phenanthrene; and
- (d) removing SBA-15 from the graphitized composite.

JP 4471174 B states that with such a method, a mesoporous carbon material can be obtained that has an average diameter of mesopores of about 2 nm to 20 nm and a size of primary particles of about 100 nm to 500 nm.

Japanese Patent No. 4912044 (JP 4912044 B) discloses a method for manufacturing a mesoporous carbon. The method includes:
- (a) impregnating a carbon precursor mixture including phenanthrene, mesophase pitch (MP), sulfuric acid, and acetone with mesoporous silica (SBA-15);
- (b) performing a heat treatment on SBA-15 containing the carbon precursor mixture at 100° C.;
- (c) performing a carbonization treatment at 1100° C. on the composite subjected to the heat treatment; and
- (d) removing SBA-15 from the composite subjected to the carbonization treatment. JP 4912044 B states that with such a method, a mesoporous carbon can be obtained that has a pore volume of 0.23 cm³/g to 1.02 cm³/g and a pore diameter of 3.5 nm to 3.6 nm.

Further, Japanese Patent No. 6305349 (JP 6305349 B) discloses a method for manufacturing a hollow graphite sphere (HGS). The method includes:
- (a) preparing a core-shell type silica sphere (SiO₂@m-SiO₂) in which a core is made of solid silica particles and a shell is made of mesoporous silica;

(b) filling the mesopores of the $SiO_2@m$-$SiO_2$ with a graphitization catalyst ($Fe(NO_3)_3 \cdot 9H_2O$), a liquid monomer (divinyl benzene (DVB)), and an initiator (azobis isobutyronitrile (AIBN)) and performing heating at 75° C. for 25 hours to polymerize the DVB;

(c) further heating the heated material at 1000° C. for four hours to carbonize/graphitize the polymerized DVB; and (d) removing $SiO_2@m$-$SiO_2$ and Fe from the material after carbonization/graphitization. JP 6305349 B states that with such a method, an HGS can be obtained that has a hollow core diameter of 200 nm to 300 nm and a shell thickness-to-core diameter ratio of 20% to 50%.

In a polymer electrolyte fuel cell, when the number of voids in the catalyst layer is too small, a flooding phenomenon is likely to occur, and sufficient current-voltage performance (IV performance) may not be obtained depending on the operating conditions. Further, when the electron conductivity of the catalyst layer is lowered, an overvoltage is generated when the electrons required for the reaction are supplied. Thus, the catalyst carrier used for the catalyst layer is required to have low filling property to secure appropriate voids in the catalyst layer, and high electron conductivity. Further, in order to reduce the cost of the polymer electrolyte fuel cell, it is also required to reduce the manufacturing cost of such a catalyst carrier.

Using the method described in JP 5481748 B, a carbon nanostructure can be obtained in which ring bodies having unique internal structures are bonded together in a network manner. When such a carbon nanostructure is used as a catalyst carrier, appropriate voids can be secured in the catalyst layer. However, in JP 5481748 B, an expensive silver acetylide is used as a raw material and an explosion method that is difficult to scale up is used. Therefore, the carbon nanostructures obtained by this method are expensive and poor in mass productivity.

Using the methods described in JP 6042922 B, JP 2016-160251 A, and JP 2015-078110 A, a carbon porous material having a large gas adsorption/desorption amount can be obtained. However, this carbon porous material has low electron conductivity. Therefore, when the carbon porous material is used in a fuel cell, an overvoltage occurs when the electrons required for the reaction are supplied. Further, since the calcium salt of terephthalic acid, which is a raw material, has a particle size of several micrometers or more, the particle size of the synthesized carbon porous material also becomes large. When the particle size of the carbon porous material becomes too large, the filling property becomes high, and not only a catalyst layer having appropriate voids cannot be obtained, but also a concentration overvoltage occurs when the catalyst particles supported in the pores are supplied with oxygen gas and protons necessary for the reaction.

The carbon carrier described in JP 2018-181838 A is made of a material obtained by pulverizing commercially available mesoporous carbon. Therefore, the pore diameter and the pore volume of the carbon carrier are almost the same as those before pulverization, and only the average particle size is substantially changed by pulverization. Further, although the filling property is lowered to some extent by pulverization, the filling property low enough to form a catalyst layer having many voids cannot be obtained. Further, since the carbonization temperature of commercially available mesoporous carbon is estimated to be about 1000° C., it is considered that the electron conductivity of this carbon carrier is insufficient.

In JP 4471174 B and JP 4912044 B, SBA-15 is used as a template. SBA-15 is known to have cylinder-shaped mesopores and micropores connecting the mesopores. Thus, when SBA-15 is used as a template to perform filling and carbonization of the carbon source, mesoporous carbon can be obtained in which rod-shaped carbons are linked. However, even when SBA-15 is used as a template, massive mesoporous carbon having a large particle size and low filling property cannot be obtained. In JP 4471174 B and JP 4912044 B, phenanthrene and mesophase pitch are used as carbon sources. Since these have low solubility in a solvent, it is necessary to repeat impregnation with a low-concentration solution and a heat treatment a plurality of times in order to precipitate a predetermined amount of carbon in the mesopores.

Further, using the method described in JP 6305349 B, hollow graphite spheres can be obtained. However, since hollow graphite spheres have high filling properties, it is difficult to secure a sufficient amount of voids in the catalyst layer when the hollow graphite spheres are used for the catalyst layer. Further, since the carbonization treatment temperature in JP 6305349 B is 600° C. to 1400° C., it cannot be said that the hollow graphite spheres have sufficient electron conductivity.

SUMMARY

The present disclosure provides mesoporous carbon with low filling property and low cost, and a method for manufacturing the mesoporous carbon. The present disclosure also provides mesoporous carbon having excellent electron conductivity and a method for manufacturing the mesoporous carbon. Furthermore, the present disclosure provides a polymer electrolyte fuel cell including such mesoporous carbon as a catalyst carrier.

A first aspect of the present disclosure relates to mesoporous carbon including a beaded structure in which primary particles with mesopores are linked. In the mesoporous carbon, an average primary particle size is 7 nm or more and 300 nm or less, a pore diameter is 2 nm or more and 10 nm or less, an average thickness of pore walls is 3 nm or more and 15 nm or less, a pore volume is 0.2 mL/g or more and 3.0 mL/g or less, and a tap density is 0.03 $g/cm^3$ or more and 0.3 $g/cm^3$ or less.

The mesoporous carbon may be obtained by performing a graphitization treatment at a temperature higher than 1500° C.

A second aspect of the present disclosure relates to a method for manufacturing mesoporous carbon including a first step of preparing mesoporous silica that serves as a template, a second step of precipitating carbon in mesopores of the mesoporous silica to prepare a mesoporous silica-carbon composite, and a third step of removing the mesoporous silica from the mesoporous silica-carbon composite.

The mesoporous silica has a beaded structure in which primary particles with the mesopores are linked. An average primary particle size of the mesoporous silica is 7 nm or more and 300 nm or less. A pore diameter of the mesopores is 3 nm or more and 15 nm or less. An average thickness of pore walls of the mesopores is 2 nm or more and 10 nm or less. A pore volume of the mesoporous silica is 0.2 mL/g or more and 3.0 mL/g or less. A tap density of the mesoporous silica is 0.03 $g/cm^3$ or more and 0.3 $g/cm^3$ or less.

The method may further include a fourth step of performing a heat treatment on the mesoporous carbon at a temperature higher than 1500° C. after the third step.

A third aspect of the present disclosure relates to a polymer electrolyte fuel cell including an air electrode catalyst layer, which includes the mesoporous carbon according the first aspect as a catalyst carrier.

When an air electrode catalyst layer is prepared using mesoporous carbon having a beaded structure as a catalyst carrier and a polymer electrolyte fuel cell is prepared using the air electrode catalyst layer, the IV performance equal to or higher than that of the related art can be obtained, especially in a high current density range. It is considered that this is because the mesoporous carbon has a beaded structure, so that an appropriate amount of voids is secured in the air electrode catalyst layer and flooding is suppressed. Further, when heat treatment is performed on the mesoporous carbon at a temperature of higher than 1500° C., the IV performance of the fuel cell using the mesoporous carbon is further improved. This is considered to be due to the proceeding of the graphitization of the mesoporous carbon by the heat treatment at higher than 1500° C., which improves the electron conductivity of the mesoporous carbon.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 shows SEM images of cross sections of membrane electrode assemblies (MEAs) obtained in Examples 1 and 2 (upper part) and enlarged SEM images of cross sections of air electrode catalyst layers of the MEAs (lower part);

DETAILED DESCRIPTION OF EMBODIMENTS

Figure 1:
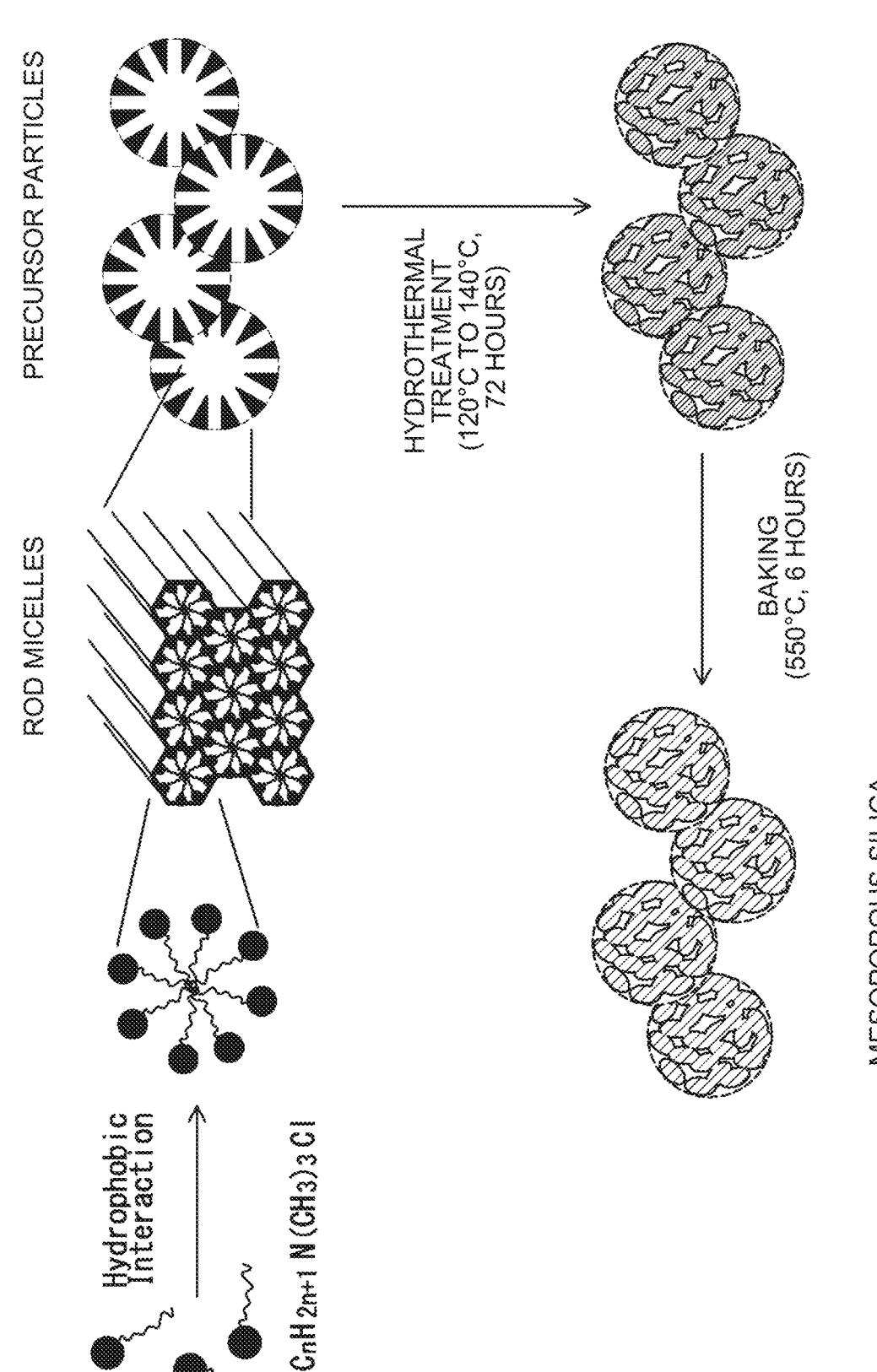
FIG. 1 is a schematic diagram showing a method for manufacturing mesoporous silica.

Hereinafter, an embodiment of the present disclosure will be described in detail.

1. Mesoporous Carbon

A mesoporous carbon according to the present disclosure has a beaded structure in which primary particles having mesopores are linked. The mesoporous carbon has an average primary particle size of 7 nm or more and 300 nm or less, an average pore diameter of 2 nm or more and 10 nm or less, an average thickness of pore walls of 3 nm or more and 15 nm or less, a pore volume of 0.2 mL/g or more and 3.0 mL/g or less, and a tap density of 0.03 g/cm³ or more and 0.3 g/cm³ or less.

1.1. Beaded Structure

As will be described later, the mesoporous carbon according to the present disclosure is manufactured using mesoporous silica as a template. Mesoporous silica is usually synthesized by polycondensing the silica source in a reaction solution containing a silica source, a surfactant, and a catalyst. At this time, when the concentration of the surfactant and the concentration of the silica source in the reaction solution are each limited to a specific range, mesoporous silica can be obtained that has a beaded structure and has an average primary particle size, a pore diameter, a pore volume, a tap density, etc. in specific ranges. Further, when the mesoporous silica having such a beaded structure is used as a template, a mesoporous carbon having a beaded structure can be obtained.

Here, the "beaded structure" refers to a structure in which primary particles are linked in a string shape. The primary particles constituting the beaded structure have mesopores inside. The mesopores in the primary particles are the cavities that remain after removing the pore walls of the mesoporous silica used as the template. The shape of the primary particles is not usually perfectly spherical, and has a distorted shape with an aspect ratio of about 1.1 to 3.

1.2. Average Primary Particle Size

The "average primary particle size" means the average value of the lengths of the primary particles in the minor axis direction. The "length in the minor axis direction" means the length in the direction perpendicular to the direction in which the length of the primary particle is the longest (major axis direction). The average primary particle size is obtained by measuring the lengths, in the minor axis direction, of 100 or more randomly selected primary particles using a microscope and calculating the average value.

In general, when the average primary particle size is too small, it is difficult for the catalyst to be supported in the carbon pores. Therefore, the average primary particle size needs to be 7 nm or more. The average primary particle size is preferably 10 nm or more, more preferably 20 nm or more.

On the other hand, when the average primary particle size is too large, it is difficult for the catalyst supported in the pores to be supplied with the reaction gas and protons, or it is difficult for the water generated by the reaction to be discharged. Therefore, the average primary particle size needs to be 300 nm or less. The average primary particle size is preferably 250 nm or less, more preferably 150 nm or less.

1.3. Pore Diameter

The "pore diameter" refers to the average value of the diameters of the mesopores included in the primary particles, and does not include the size of the voids between the primary particles. The pore diameter is obtained by analyzing the adsorption data of the nitrogen adsorption isotherm of the mesoporous carbon by the Barret-Joyner-Halenda (BJH) method to obtain the pore diameter at the time when the pore volume is maximized (most frequent peak value).

In general, when the pore diameter is too small, it is difficult for the catalyst supported in the pores to be supplied with the reaction gas and protons, or it is difficult for the water generated by the reaction to be discharged. Therefore, the pore diameter needs to be 2 nm or more. The pore diameter is preferably 2.5 nm or more. On the other hand, when the pore diameter is too large, ionomers easily enter the pores and poison the catalyst. As a result, the activity decreases. Therefore, the pore diameter needs to be 10 nm or less. The pore diameter is preferably 7 nm or less, more preferably 5 nm or less.

1.4. Average Thickness of Pore Walls

The "average thickness of the pore walls" means the average value of the thicknesses of the pore walls of the mesopores included in the primary particles. The average thickness of the pore walls is obtained by measuring the thicknesses of 100 or more randomly selected pore walls using a microscope and calculating the average value.

When the average thickness of the pore walls is too small, the carbon is likely to be oxidized and the durability is deteriorated. Therefore, the average thickness of the pore walls needs to be 3 nm or more. The average thickness is preferably 3.5 nm or more, more preferably 4 nm or more. On the other hand, when the average thickness of the pore walls is too large, the pore volume becomes small and it is difficult for the catalyst to be supported. Therefore, the average thickness of the pore walls needs to be 15 nm or less. The average thickness is preferably 12 nm or less, more preferably 10 nm or less.

1.5. Pore Volume

The "pore volume" refers to the volume of mesopores included in the primary particles, and does not include the volume of voids between the primary particles. The pore volume is obtained by analyzing the adsorption data of the nitrogen adsorption isotherm of mesoporous carbon by the BJH method and calculating the value of P/P0=0.03 to 0.99.

In general, when the pore volume is too small, it is difficult for the catalyst to be supported. Therefore, the pore volume needs to be 0.2 mL/g or more. The pore volume is preferably 0.5 mL/g or more, and more preferably 1.0 mL/g or more. On the other hand, when the pore volume is too large, the ratio of carbon pore walls becomes small and the electron conductivity becomes low. In addition, the amount of ionomers entering increases, and the activity decreases due to catalyst poisoning. Therefore, the pore volume needs to be 3.0 mL/g or less. The pore volume is preferably 2.5 mL/g or less, more preferably 2.0 mL/g or less.

1.6. Tap Density

The "tap density" means a value measured in accordance with Japanese Industrial Standards (JIS) Z 2512. In general, when the tap density is too small, the thickness of the obtained catalyst layer becomes too large, and the proton conductivity decreases. Therefore, the tap density needs to be 0.03 g/cm$^3$ or more. The tap density is preferably 0.05 g/cm$^3$ or more, more preferably 0.08 g/cm$^3$ or more. On the other hand, in the case where the tap density is too large, it becomes difficult to secure voids in the catalyst layer that can suppress flooding, when the catalyst layer is prepared using the mesoporous carbon having such tap density. Therefore, the tap density needs to be 0.3 g/cm$^3$ or less. The tap density is preferably 0.20 g/cm$^3$ or less, more preferably 0.15 g/cm$^3$ or less.

1.7. Graphitization Degree

Mesoporous carbon is obtained by filling the mesopores of mesoporous silica with a carbon source and carbonizing the carbon source. In order to suppress the reaction between mesoporous silica and carbon, it is necessary to make the carbonization temperature of the carbon source relatively low. Therefore, the mesoporous carbon after carbonizing the carbon source tends to have a disordered layer structure. The mesoporous carbon having a disordered layer structure has lower electron conductivity than the mesoporous carbon having a graphite structure.

When the mesoporous carbon having a disordered layer structure is subjected to the graphitization treatment at a temperature exceeding 1500° C., the mesoporous carbon having a disordered layer structure gradually changes to mesoporous carbon having a graphite structure. In general, the higher the graphitization treatment temperature, the higher the degree of graphitization.

1.8. Specific Surface Area

In the case where the mesoporous carbon according to the present disclosure is used as a catalyst carrier on the air electrode side of a polymer electrolyte fuel cell, when the specific surface area of the mesoporous carbon is too small, the mesoporous carbon becomes unable to support the active species of the catalyst in fine particles with a high degree of dispersion and the effective area of the catalyst becomes smaller. Therefore, the larger the specific surface area of the mesoporous carbon, the better. Using the method described later, the specific surface area of mesoporous carbon is 800 m$^2$/g or more, 1000 m$^2$/g or more, or 1200 m$^2$/g or more.

2. Mesoporous Silica (Template)

In the present disclosure, mesoporous silica is used as a template for preparing mesoporous carbon having a beaded structure. In the present disclosure, the mesoporous silica has a beaded structure in which primary particles having mesopores are linked. In the mesoporous carbon, the average primary particle size of mesoporous silica is 7 nm or more and 300 nm or less, the pore diameter of the mesopores is 3 nm or more and 15 nm or less, the average thickness of the pore walls of the mesopores is 2 nm or more and 10 nm or less, the pore volume of the mesoporous silica is 0.2 mL/g or more and 3.0 mL/g or less, and the tap density of the mesoporous silica is 0.03 g/cm$^3$ or more and 0.3 g/cm$^3$ or less.

2.1. Beaded Structure

The "beaded structure" refers to a structure in which primary particles are linked together in a string shape. Since the details of the beaded structure are as described above, the description thereof will be omitted.

2.2. Average Primary Particle Size

In general, when the average primary particle size of mesoporous silica is too small, the average primary particle size of the mesoporous carbon manufactured using the mesoporous silica also becomes excessively small. Therefore, the average primary particle size needs to be 7 nm or more. The average primary particle size is preferably 10 nm or more, more preferably 20 nm or more. On the other hand, when the average primary particle size of mesoporous silica is too large, the average primary particle size of the mesoporous carbon manufactured using the mesoporous silica also becomes excessively large. Therefore, the average primary particle size needs to be 300 nm or less. The average primary particle size is preferably 250 nm or less, more preferably 150 nm or less.

2.3. Pore Diameter

In general, when the pore diameter of the mesoporous silica is too small, the thicknesses of the pore walls of the mesoporous carbon manufactured using the mesoporous silica become excessively small. Therefore, the pore diameter needs to be 3 nm or more. The pore diameter is preferably 3.5 nm or more, more preferably 4 nm or more. On the other hand, when the pore diameter of the mesoporous silica is too large, the thicknesses of the pore walls of the mesoporous carbon manufactured using the mesoporous silica become excessively large. Therefore, the pore diameter needs to be 15 nm or less. The pore diameter is preferably 12 nm or less, more preferably 10 nm or less.

2.4. Average Thickness of Pore Walls

When the average thickness of the pore walls of the mesoporous silica is too small, the pore diameter of the mesoporous carbon manufactured using the mesoporous silica becomes excessively small. Therefore, the average thickness of the pore walls needs to be 2 nm or more. The average thickness is preferably 2.5 nm or more. On the other hand, when the average thickness of the pore walls of the mesoporous silica is too large, the pore diameter of the mesoporous carbon manufactured using the mesoporous silica becomes excessively large. Therefore, the average thickness of the pore walls needs to be 10 nm or less. The average thickness is preferably 7 nm or less, more preferably 5 nm or less.

2.5. Pore Volume

In general, when the pore volume of the mesoporous silica is too small, the pore volume of the mesoporous carbon manufactured using the mesoporous silica becomes excessively large. Therefore, the pore volume needs to be 0.2 mL/g or more. The pore volume is preferably 0.4 mL/g or more, more preferably 0.6 mL/g or more. On the other hand, when the pore volume of the mesoporous silica is too large, the pore volume of the mesoporous carbon manufactured using the mesoporous silica becomes excessively small. Therefore, the pore volume needs to be 3.0 mL/g or less. The pore volume is preferably 2 mL/g or less, more preferably 1.5 mL g or less.

2.6. Tap Density

In general, when the tap density of the mesoporous silica is too small, the tap density of the mesoporous carbon manufactured using the mesoporous silica becomes excessively small. Therefore, the tap density needs to be 0.03 $g/cm^3$ or more. The tap density is preferably 0.05 $g/cm^3$ or more, more preferably 0.08 $g/cm^3$ or more. On the other hand, when the tap density of the mesoporous silica is too large, the tap density of the mesoporous carbon manufactured using the mesoporous silica becomes excessively large. Therefore, the tap density needs to be 0.3 $g/cm^3$ or less. The tap density is preferably 0.2 $g/cm^3$ or less, more preferably 0.15 $g/cm^3$ or less.

2.7. Specific Surface Area

The mesoporous carbon according to the present disclosure is manufactured using mesoporous silica as a template. Therefore, the larger the specific surface area of the mesoporous silica used as the template is, the larger the specific surface area of the mesoporous carbon can be obtained. In order to obtain mesoporous carbon having a high specific surface area, the specific surface area of the mesoporous silica is preferably 400 $m^2/g$ or more. The specific surface area is preferably 500 $m^2/g$ or more, more preferably 600 $m^2/g$ or more.

3. Method for Manufacturing Mesoporous Silica (Template)

The method for manufacturing mesoporous silica according to the present disclosure includes: a polymerization step of polycondensing a silica source in a reaction solution containing the silica source, a surfactant, and a catalyst to obtain precursor particles; a drying step of separating the precursor particles from the reaction solution and drying the precursor particles; and a baking step of baking the precursor particles to obtain mesoporous silica particles according to the present disclosure. The method for manufacturing mesoporous silica particles according to the present disclosure may further include a diameter expansion step of performing a diameter expansion treatment on the dried precursor particles.

3.1. Polymerization Step

First, a silica source is polycondensed in the reaction solution containing the silica source, a surfactant, and a catalyst to obtain precursor particles (polymerization step).

3.1.1. Silica Source

In the present disclosure, the type of the silica source is not particularly limited. Examples of the silica source include:

(a) tetraalkoxysilanes such as tetramethoxysilane, tetraethoxysilane, tetraisopropoxysilane, tetrabutoxysilane, dimethoxydiethoxysilane, and tetraethyleneglycoxysilane; and (b) trialkoxysilanes such as 3-mercaptopropyltrimethoxysilane, 3-aminopropyltrimethoxysilane, 3-aminopropyltriethoxysilane, 3-(2-aminoethyl) aminopropyltrimethoxysilane. As the silica source, any one of the above may be used, or two or more thereof may be used in combination.

3.1.2. Surfactant

In the case where the silica source is polycondensed in the reaction solution, when a surfactant is added to the reaction solution, the surfactant forms micelles in the reaction solution. Since hydrophilic groups are gathered around the micelles, the silica source is adsorbed on the surfaces of the micelles. Further, the micelles adsorbed by the silica source self-assemble in the reaction solution, and the silica source is polycondensed. As a result, mesopores due to micelles are formed inside the primary particles. The size of the mesopores can be controlled (from 1 nm to 50 nm) mainly by the molecular length of the surfactant.

In the present disclosure, an alkyl quaternary ammonium salt is used as the surfactant. The alkyl quaternary ammonium salt refers to a compound represented by the following formula (a).

$$CH_3—(CH_2)_n—N^+(R_1)(R_2)(R_3)X^- \qquad (a)$$

In the formula (a), $R_1$, $R_2$, and $R_3$ each represent an alkyl group having 1 to 3 carbon atoms. $R_1$, $R_2$, and $R_3$ may be the same as or different from each other. In order to facilitate aggregation of alkyl quaternary ammonium salts (formation of micelles), it is preferable that $R_1$, $R_2$, and $R_3$ are all the same. Further, at least one of $R_1$, $R_2$, and $R_3$ is preferably a methyl group, and all of them are preferably methyl groups. In the formula (a), X represents a halogen atom. The type of halogen atom is not particularly limited, but X is preferably Cl or Br from the viewpoint of easy availability.

In the formula (a), n represents an integer of 7 to 21. Generally, as n becomes smaller, a spherical mesoporous material having a smaller median pore diameter of the mesopores can be obtained. On the other hand, as n becomes larger, the median pore diameter becomes larger. However, when n becomes too large, the hydrophobic interaction of the alkyl quaternary ammonium salt becomes excessive. As a result, a layered compound is produced, and a mesoporous material cannot be obtained. n is preferably 9 to 17, and more preferably 13 to 17.

Among those represented by the formula (a), alkyltrimethylammonium halide is preferable. Examples of the alkyltrimethylammonium halide include hexadecyltrimethylammonium halide, octadecyltrimethylammonium halide, nonyltrimethylammonium halide, decyltrimethylammonium halide, undecyltrimethylammonium halide, and dodecyltrimethylammonium halide. Among these, alkyltrimethylammonium bromide or alkyltrimethylammonium chloride is particularly preferable.

When mesoporous silica is synthesized, one kind of alkyl quaternary ammonium salt may be used, or two or more kinds thereof may be used. However, since the alkyl quaternary ammonium salt serves as a template for forming mesopores in the primary particles, its type has a great influence on the shape of the mesopores. In order to synthesize silica particles having more uniform mesopores, it is preferable to use one kind of alkyl quaternary ammonium salt.

3.1.3. Catalyst

When the silica source is polycondensed, a catalyst is usually added to the reaction solution. When synthesizing particulate mesoporous silica, it is preferable to use an alkali such as sodium hydroxide or aqueous ammonia as the catalyst.

3.1.4. Solvent

As the solvent, an organic solvent such as water or alcohol, a mixed solvent of water and an organic solvent, or the like is used. Alcohol may be any of the following:

(1) monohydric alcohols such as methanol, ethanol, and propanol;

(2) divalent alcohols such as ethylene glycol; and (3) trivalent alcohols such as glycerin.

When a mixed solvent of water and an organic solvent is used, the content of the organic solvent in the mixed solvent can be selected as desired depending on the intended purpose. In general, adding an appropriate amount of an organic solvent to a solvent facilitates control of particle size and particle size distribution.

3.1.5. Composition of Reaction Solution

The composition in the reaction solution has an influence on the outer shape and the pore structure of the mesoporous silica to be synthesized. In particular, the concentration of the surfactant in the reaction solution and the concentration of the silica source have a large influence on the average primary particle size, the pore diameter, the pore volume, and the tap density of the mesoporous silica particles.

A. Concentration of Surfactant

When the concentration of the surfactant is too low, the precipitation rate of the particles becomes low and a structure in which the primary particles are linked cannot be obtained. Therefore, the concentration of the surfactant needs to be 0.03 mol/L or more. The concentration of the surfactant is preferably 0.035 mol/L or more, more preferably 0.04 mol/L or more.

On the other hand, when the concentration of the surfactant is too high, the precipitation rate of the particles becomes too high and the primary particle size easily exceeds 300 nm. Therefore, the concentration of the surfactant needs to be 1.0 mol/L or less. The concentration of the surfactant is preferably 0.95 mol/L or less, more preferably 0.90 mol/L or less.

B. Concentration of Silica Source

When the concentration of the silica source is too low, the precipitation rate of the particles becomes low and a structure in which the primary particles are linked cannot be obtained. Alternatively, the surfactant may be excessive and uniform mesopores may not be obtained. Therefore, the concentration of the silica source needs to be 0.05 mol/L or more. The concentration of the silica source is preferably 0.06 mol/L or more, more preferably 0.07 mol/L or more.

On the other hand, when the concentration of the silica source is too high, the precipitation rate of the particles becomes too high and the primary particle size easily exceeds 300 nm. Alternatively, sheet-like particles may be obtained instead of spherical particles. Therefore, the concentration of the silica source needs to be 1.0 mol/L or less. The concentration of the silica source is preferably 0.95 mol/L or less, more preferably 0.9 mol/L or less.

C. Concentration of Catalyst

In the present disclosure, the concentration of the catalyst is not particularly limited. In general, when the concentration of the catalyst is too low, the precipitation rate of the particles becomes low. On the other hand, when the concentration of the catalyst is too high, the precipitation rate of the particles becomes high. The optimum concentration of the catalyst is preferably selected according to the type of the silica source, the type of the surfactant, the target physical property values, and the like.

3.1.6 Reaction Conditions

A silica source is added to a solvent containing a predetermined amount of a surfactant, and hydrolysis and polycondensation are carried out. As a result, the surfactant functions as a template, and precursor particles containing silica and the surfactant are obtained. The optimum reaction conditions are selected according to the type of the silica source, the particle size of the precursor particles, and the like. In general, the reaction temperature is preferably −20° C. to 100° C. The reaction temperature is more preferably 0° C. to 90° C., still more preferably 10° C. to 80° C.

3.2. Drying Step

Next, the precursor particles are separated from the reaction solution and dried (drying step). Drying is performed to remove the solvent remaining in the precursor particles. The drying conditions are not particularly limited as long as the solvent can be removed.

3.3. Diameter Expansion Treatment

Next, if necessary, the dried precursor particles may be subjected to a diameter expansion treatment (diameter expansion step). The "diameter expansion treatment" refers to treatment for expanding the diameter of the mesopores in the primary particles. Specifically, the diameter expansion treatment is performed by hydrothermally treating the synthesized precursor particles (in which the surfactant has not been removed) in a solution containing the diameter-expanding agent. By this treatment, the pore diameter of the precursor particles can be increased.

Examples of the diameter-expanding agent include:

(a) hydrocarbons such as trimethylbenzene, triethylbenzene, benzene, cyclohexane, triisopropylbenzene, naphthalene, hexane, heptane, octane, nonane, decane, undecane, and dodecane; and (b) acids such as hydrochloric acid, sulfuric acid, and nitric acid.

The expansion of the pore diameter by a hydrothermal treatment in the presence of hydrocarbon is considered to be due to the rearrangement of silica that occurs when the diameter-expanding agent is introduced from the solvent into the pores of the more hydrophobic precursor particles. Further, the expansion of the pore diameter by a hydrothermal treatment in the presence of an acid such as hydrochloric acid is considered to be due to the proceeding of dissolution and reprecipitation of silica inside the primary particles. When the manufacturing conditions are optimized, radial pores are formed inside the silica. When this is hydrothermally treated in the presence of an acid, dissolution and reprecipitation of silica occurs, and the radial pores are converted into communicating pores.

The conditions for the diameter expansion treatment are not particularly limited as long as the desired pore diameter can be obtained. Usually, it is preferable to add a diameter-expanding agent of about 0.05 mol/L to 10 mol/L to the reaction solution and perform a hydrothermal treatment at 60° C. to 150° C.

3.4. Baking Step

Next, after the diameter expansion treatment is performed as necessary, the precursor particles are baked (baking step). As a result, the mesoporous silica particles according to the present disclosure can be obtained. The baking is performed to dehydrate and crystallize the precursor particles in which OH groups remain and to thermally decompose the surfactant remaining in the mesopores. The baking conditions are not particularly limited as long as dehydration/crystallization of the precursor particles and thermal decomposition of the surfactant are possible. Baking is usually performed by heating in the air at 400° C. to 700° C. for one hour to 10 hours.

4. Method for Manufacturing Mesoporous Carbon

The method for manufacturing mesoporous carbon according to the present disclosure includes: a first step of preparing mesoporous silica that serves as a template; a second step of precipitating carbon in mesopores of the mesoporous silica to prepare a mesoporous silica-carbon composite; and a third step of removing the mesoporous silica from the composite. The method for manufacturing mesoporous carbon may further include a fourth step of performing a heat treatment on the mesoporous carbon at a temperature higher than 1500° C. after the third step.

4.1. First Step (Preparation of Template)

First, mesoporous silica that serves as a template is prepared (first step). The details of the mesoporous silica and the method for manufacturing the same are as described above, and thus the description thereof will be omitted.

4.2. Second Step (Carbon Precipitation into Mesopores)

Next, carbon is precipitated in the mesopores of the mesoporous silica to prepare a mesoporous silica/carbon composite (second step).

Specifically, the precipitation of carbon in the mesopores is carried out by:

(a) introducing a carbon precursor into the mesopores; and (b) polymerizing and carbonizing the carbon precursor in mesopores.

4.2.1. Introduction of Carbon Precursor

The "carbon precursor" means ones capable of producing carbon by thermal decomposition. Specifically, examples of the carbon precursor include:

(1) polymer precursors that are liquid at room temperature and are thermally polymerizable (for example, furfuryl alcohol, aniline, etc.);

(2) a mixture of an aqueous carbohydrate solution and an acid (for example, mixture of monosaccharides such as sucrose, xylose (wood sugar), glucose (dextrose), disaccharides, or polysaccharides, and sulfuric acid, hydrochloric acid, nitric acid, phosphoric acid); and (3) a two-component curable polymer precursor mixture (for example, phenol and formalin, etc.).

Among the above, since the mesopores can be impregnated with the polymer precursor without the need for dilution with a solvent, a relatively large amount of carbon can be generated in the mesopores with a relatively small number of times of impregnation. In addition, there is an advantage that a polymerization initiator is not required and handling is easy.

When a liquid or solution carbon precursor is used, the larger the amount of the liquid or solution adsorbed at one time, the better, and such an amount that the entire mesopores are filled with the liquid or solution is preferable. When a mixture of an aqueous solution of carbohydrate and an acid is used as the carbon precursor, the amount of the acid is preferably the minimum amount capable of polymerizing the organic substance. Further, when a two-component curable polymer precursor mixture is used as the carbon precursor, the optimum ratio is selected according to the type of the polymer precursor.

4.2.2. Polymerization and Carbonization of Carbon Precursor

The polymerized carbon precursor is then carbonized in the mesopores. Carbonization of the carbon precursor is carried out by heating mesoporous silica containing the carbon precursor to a predetermined temperature in a non-oxidizing atmosphere (for example, in an inert atmosphere, in a vacuum, etc.). Specifically, the heating temperature is preferably 500° C. or higher and 1200° C. or lower. When the heating temperature is less than 500° C., the carbon precursor is insufficiently carbonized. On the other hand, when the heating temperature exceeds 1200° C., silica and carbon react with each other, which is not preferable. The optimum heating time is selected according to the heating temperature.

The amount of carbon generated in the mesopores may be equal to or larger than such an amount that the carbon particles can maintain their shapes when the mesoporous silica is removed. Therefore, when the amount of carbon produced by one filling, polymerization and carbonization is relatively small, it is preferable to repeat these steps a plurality of times. In this case, the conditions of each repeated step may be the same or different. When the steps of filling, polymerization and carbonization are repeated a plurality of times, the carbonization treatment may be performed at a relatively low temperature in each carbonization step, and after the final carbonization treatment is completed, the carbonization treatment may be performed again at a higher temperature. When the final carbonization treatment is performed at a temperature higher than those of the previous carbonization treatments, the carbon introduced into the pores over a plurality of times is easily integrated.

4.3. Third Step (Removal of Template)

Next, the mesoporous silica serving as a template is removed from the composite (third step). As a result, mesoporous carbon is obtained.

Specifically, examples of the method for removing mesoporous silica include:

(1) a method of heating the composite in an alkaline aqueous solution such as sodium hydroxide; and (2) a method of etching the composite with an aqueous solution of hydrofluoric acid.

4.4. Fourth Step (Graphitization Treatment)

Next, if necessary, the mesoporous carbon is subjected to a heat treatment at a temperature higher than 1500° C. (fourth step). When the carbon source is carbonized in the mesopores of mesoporous silica, the heat treatment temperature has to be lowered in order to suppress the reaction between silica and the carbon. Therefore, the degree of graphitization of carbon after the carbonization treatment is low. In order to obtain a high degree of graphitization, it is preferable to perform the heat treatment on the mesoporous carbon at a high temperature after removing the template.

When the heat treatment temperature is too low, graphitization becomes insufficient. Therefore, the heat treatment temperature is preferably higher than 1500° C. The heat treatment temperature is preferably 1700° C. or higher, more preferably 1800° C. or higher. On the other hand, even when the heat treatment temperature is raised more than necessary, there is no difference in the effect and thus provides no actual benefit. Therefore, the heat treatment temperature is preferably 2300° C. or lower. The heat treatment temperature is preferably 2200° C. or lower.

5. Polymer Electrolyte Fuel Cell

In the polymer electrolyte fuel cell according to the present disclosure, the mesoporous carbon according to the present disclosure is used as a catalyst carrier for at least an air electrode catalyst layer. The composition of the air electrode catalyst layer (for example, the amount of Pt per unit area, the ratio of the weight of ionomers to the weight of carbon (I/C ratio), etc.) is not particularly limited, and an optimum value can be selected depending on the purpose. Further, the configuration other than the air electrode catalyst layer is not particularly limited, and the optimum configuration can be selected depending on the purpose. The mesoporous carbon according to the present disclosure can also be used as a catalyst carrier on the fuel electrode side.

6. Operation

FIG. 1 shows a schematic diagram of a method for manufacturing mesoporous silica. In the case where the silica source is polycondensed in the reaction solution, when a surfactant is added to the reaction solution, the surfactant forms micelles in the reaction solution. At this time, when the solution composition is optimized, rod micelles made of a surfactant are formed, and the silica source is adsorbed on the surface of the rod micelles. Further, the rod micelles that have adsorbed the silica source are arranged radially to form particles having a low aspect ratio, and at the same time, these particles are linked together in a string shape, and in this state, the silica source is polycondensed. As a result, precursor particles having a beaded structure are obtained.

Next, when the precursor particles are subjected to a hydrothermal treatment (diameter expansion treatment) under predetermined conditions (for example, 120° C. to 140° C., 72 hours) as necessary, the radial pores are converted into communicating pores. Further, when the precursor particles are baked under predetermined conditions (for example, 550° C., six hours), dehydration and crystallization of the precursor particles in which OH groups remain proceed, and at the same time, the surfactant is removed. As a result, mesoporous silica having a beaded structure is obtained.

Figure 2:
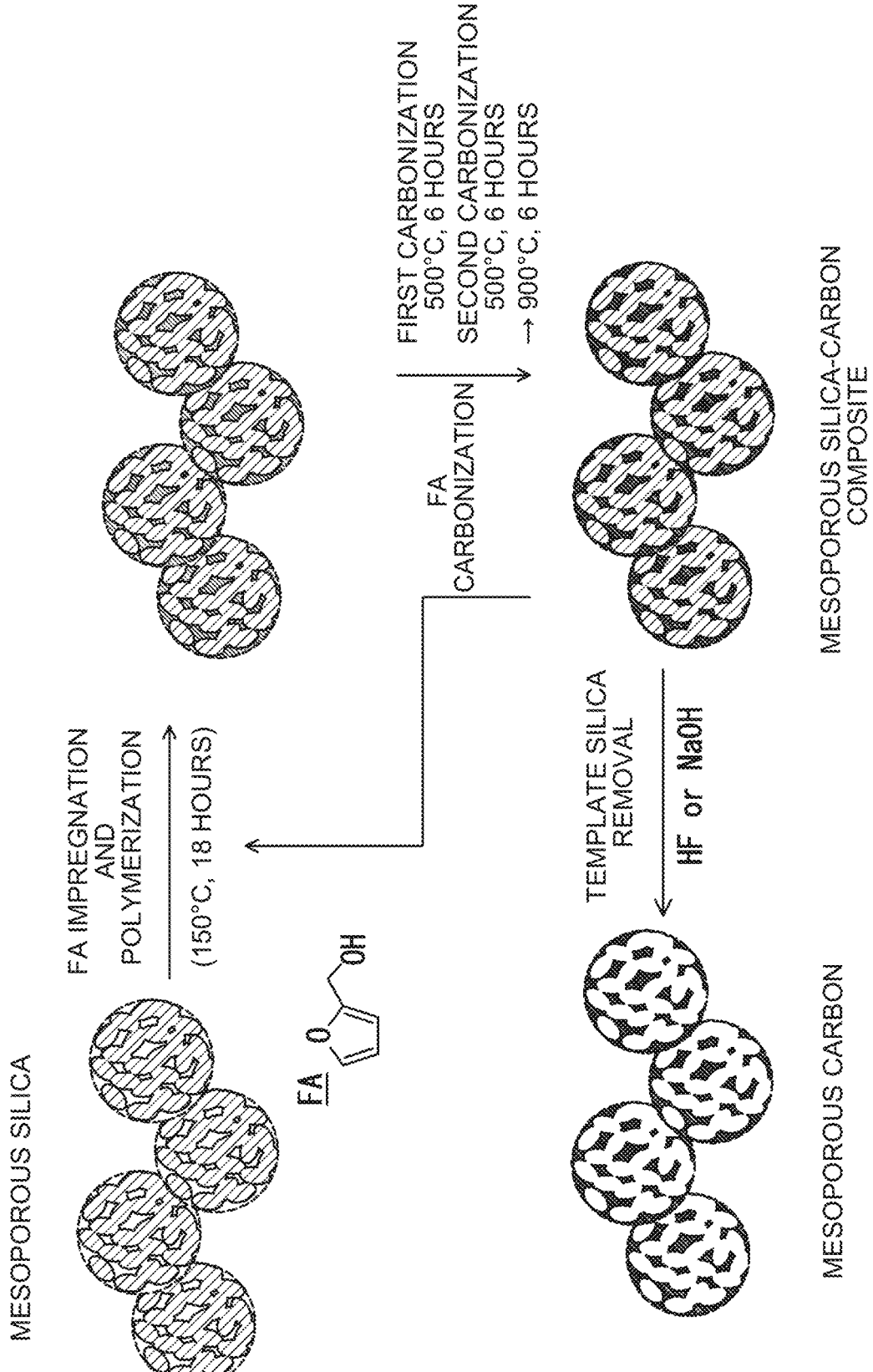
FIG. 2 is a schematic diagram showing a method for manufacturing mesoporous carbon.

FIG. 2 shows a schematic diagram of a method for manufacturing mesoporous carbon. Next, the obtained mesoporous silica is impregnated with a carbon source (for example, furfuryl alcohol (FA)) and polymerized under predetermined conditions (for example, 150° C., 18 hours). The polymerized FA is then carbonized under predetermined conditions (for example, 500° C., six hours). The impregnation, polymerization, and carbonization steps are repeated a plurality of times (for example, twice) and then a heat treatment is performed under predetermined conditions (for example, 900° C., six 6 hours) to obtain a mesoporous silica-carbon composite. After the heat treatment, the template silica is removed using HF or NaOH to obtain mesoporous carbon having a beaded structure.

When an air electrode catalyst layer is prepared using the mesoporous carbon thus obtained as a catalyst carrier and a polymer electrolyte fuel cell is prepared using this air electrode catalyst layer, IV performance equal to or higher than the IV performance of the related art can be obtained especially in a high current density range. It is considered that this is because the mesoporous carbon has a beaded structure, so that an appropriate amount of voids is secured in the air electrode catalyst layer and flooding is suppressed. Further, by performing a heat treatment on the mesoporous carbon at a temperature of higher than 1500° C., the IV performance of the fuel cell using the mesoporous carbon is improved. This is considered to be due to the proceeding of the graphitization of the mesoporous carbon by the heat treatment at higher than 1500° C., which improves the electron conductivity of the mesoporous carbon.

Examples 1 to 3, Comparative Examples 1 and 2

1. Preparation of Carbon Carrier 1.1. Examples 1 to 3, Comparative Example 1

1.1.1. Preparation of Mesoporous Silica

A predetermined amount of surfactant and 1N sodium hydroxide were added to a mixed solvent containing predetermined amounts of water, methanol, and ethylene glycol (EG) to obtain a first solution. Separately, a predetermined amount of tetraethoxysilane (TEOS) was added to a mixed solvent containing predetermined amounts of methanol and EG to obtain a second solution. Table 1 shows the amounts of solutions charged.

TABLE 1

| | | Example 1 | Example 2 | Example 3 | Comparative Example 1 |
|---|---|---|---|---|---|
| First solution | Water (g) | 482.5 | 476 | 185 | 1970.3 |
| | Methanol (g) | 122 | 160.5 | 30.8 | 1156 |
| | EG (g) | 122 | 53.5 | 30.8 | |
| | Surfactant (g) | 14.1 | 24 | 24 | 14.08 |
| | 1N NaOH (g) | 13.7 | 24 | 13.7 | 13.68 |
| Second solution | TEOS (g) | 14.5 | 25.5 | 14.5 | 14.48 |
| | Methanol (g) | 30 | 67.5 | 30 | 60 |
| | EG (g) | 30 | 22.5 | 30 | |

When the second solution was added to the first solution, it was confirmed that the solution became cloudy after a while and the particles could be synthesized. After stirring at room temperature for eight hours, the mixture was filtered and the residue was re-dispersed in water. After filtering was performed again, the residue was dried in an oven at 45° C. The dried sample was dispersed in 2N sulfuric acid and then heated at 120° C. for three days in an autoclave. After filtering and washing of the sample after the autoclave treatment was performed, the sample was baked at 550° C. for six hours to remove organic components.

1.1, 2. Preparation of Mesoporous Carbon

Mesoporous silica was placed in a perfluoroalkoxy alkane (PFA) container, and furfuryl alcohol (FA) of the amount corresponding to the pore volume was added to allow the FA to enter the pores of the silica. FA was polymerized by performing a heat treatment at 150° C. for 18 hours. Further, a heat treatment was performed thereon at 500° C. for six hours in a nitrogen atmosphere to promote carbonization of FA. This was repeated twice and then a heat treatment was further performed at 900° C. for six hours in a nitrogen atmosphere to obtain a mesoporous silica-carbon composite. This composite was immersed in a 12% HF solution for 12 hours to dissolve the silica component. After dissolution, filtration and washing were repeated, and the mixture was further dried at 45° C. to obtain mesoporous carbon. Further, the dried mesoporous carbon was subjected to a treatment of heating at 1800° C. for one hour (graphitization treatment).

1.2. Comparative Example 2

Carbon in which solid primary particles are linked together in a string shape (Li-435, manufactured by Denka Corporation) was subjected to the test as it was.

2. Preparation of Fuel Cell

Pt was supported on the carbon carrier obtained as described above. The amount of Pt supported was 40 mass %. Using this, an air electrode catalyst layer was prepared. The weight of Pt on the air electrode side was 0.15 mg/cm².

The I/C of the air electrode catalyst layer was 1.0. Further, a fuel electrode catalyst layer was prepared using commercially available platinum-supporting carbon having a Pt-supporting amount of 30 mass %. The weight of Pt on the fuel electrode side was 0.1 mg/cm$^2$. The I/C of the fuel electrode catalyst layer was 0.75.

The air electrode catalyst layer and the fuel electrode catalyst layer were transferred to the opposite surfaces of the electrolyte membrane to obtain MEA. A fluorine-based solid polymer electrolyte membrane was used as the electrolyte membrane. The MEA was assembled into a 1 cm$^2$ square cell. Furthermore, a diffusion layer and a current collector were placed on both sides of the MEA. Carbon paper (with a microporous layer) was used as the diffusion layer. A gold-plated copper plate having a flow path integrated therewith (flow path: straight flow path with a pitch of 0.4 mm) was used as the current collector.

2. Test Method 2.1. Evaluation of Mesoporous Silica and Mesoporous Carbon 2.1.1. Average Primary Particle Size, Average Thickness of Pore Walls From a scanning electron microscope (SEM) image, the average primary particle sizes and the average thicknesses of the pore walls of the mesoporous silica and the mesoporous carbon were measured.

2.3. Evaluation of Graphitization Degree

The X-ray diffraction measurements of the mesoporous carbon before and after the graphitization treatment were performed.

3. Results 3.1. Mesoporous Silica and Mesoporous Carbon 3.1.1. SEM Image

Figure 3:
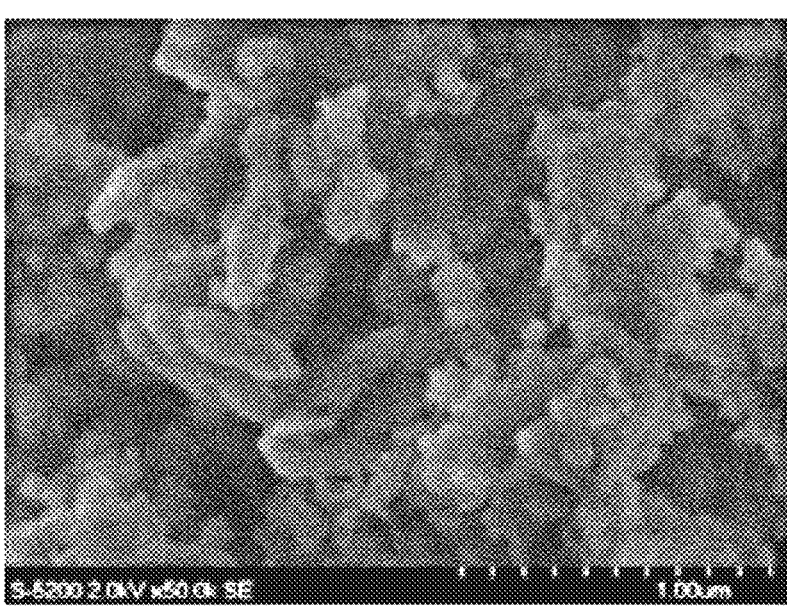
FIG. 3 is a scanning electron microscope (SEM) image of mesoporous carbon obtained in Example 1.

FIG. 3 shows an SEM image of the mesoporous carbon obtained in Example 1. FIG. 3 shows that the mesoporous carbon has a beaded structure.

3.1.2. Physical Properties

Table 2 shows the physical properties of the mesoporous silica and the mesoporous carbon. From Table 2, the following can be seen.

(1) The template of Comparative Example 1 was not mesoporous silica having a beaded structure, but isolated spherical mesoporous silica. Thus, the carbon prepared by using the mesoporous silica as a template did not have a beaded structure, and the tap density thereof exceeded 0.3 g/cm$^3$.

(2) Comparative Example 2 is a solid carbon having a beaded structure but having no mesopore in the primary particles.

(3) The mesoporous carbon obtained in Examples 1 to 3 all had beaded structures and mesopores, and had tap densities of 0.3 g/cm$^3$ or less.

TABLE 2

| | | Silica | | | | | | Carbon | | | | | |
|---|---|---|---|---|---|---|---|---|---|---|---|---|---|
| | Shape | Average Primary Particle Size (μm) | Pore Diameter* (nm) | Average Thickness of Pore Walls (nm) | Pore Volume (ml/g) | Specific Surface Area (m$^2$/g) | Tap Density (g/cm$^3$) | Average Primary Particle Size (μm) | Pore Diameter* (nm) | Average Thickness of Pore Walls (nm) | Pore Volume (ml/g) | Specific Surface Area (m$^2$/g) | Tap Density (g/cm$^3$) |
| Example 1 | Beaded | 0.12 | 6.5 | | 0.99 | 640 | 0.08 | 0.12 | 2.7 | 4.2 | 1.37 | 1304 | 0.10 |
| Example 2 | Beaded | 0.25 | 7.7 | | 0.96 | 611 | 0.10 | 0.25 | 3.1 | | 1.36 | 1140 | 0.10 |
| Example 3 | Beaded | 0.21 | 6.5 | | 0.782 | 448 | 0.16 | 0.21 | 3.4 | | 1.76 | 1207 | — |
| Comparative Example 1 | Spherical | 0.20 | 6.6 | | 0.712 | 487 | 0.35 | 0.20 | 3.1 | | 1.63 | 1159 | 0.35 |
| Comparative Example 2 | Beaded, solid | | | — | | | | 0.03 | No mesopore | — | 0.65 | — | — |

*BJH method (most frequent during adsorption)
*BJH method (most frequent during adsorption)

2.1.2. Pore Diameter, Pore Volume, and BET Specific Surface Area

The nitrogen adsorption isotherms of the mesoporous silica and the mesoporous carbon were measured. From the obtained nitrogen adsorption isotherms, the pore diameters, the pore volumes, and the BET specific surface areas were determined.

2.1.3. Tap Density

The tap densities of the mesoporous silica and the mesoporous carbon were measured according to JIS Z 2512.

2.2. Evaluation of Fuel Cell 2.2.1. SEM Observation

The SEM observation of the cross section of the MEA was performed.

2.2.2. Power Generation Characteristics

Using the obtained fuel cell, the power generation characteristics were evaluated under a high humidification condition (80% RH, cell temperature 60° C.) and a low humidification condition (30% RH, cell temperature 80° C.). The power generation conditions were set such that the H2 flow rate was 500 cc/min, the air flow rate was 1000 cc/min, and the back pressure was 1 kg/cm$^2$.

3.2. Fuel Cell 3.2.1. SEM Image

Figure 4:
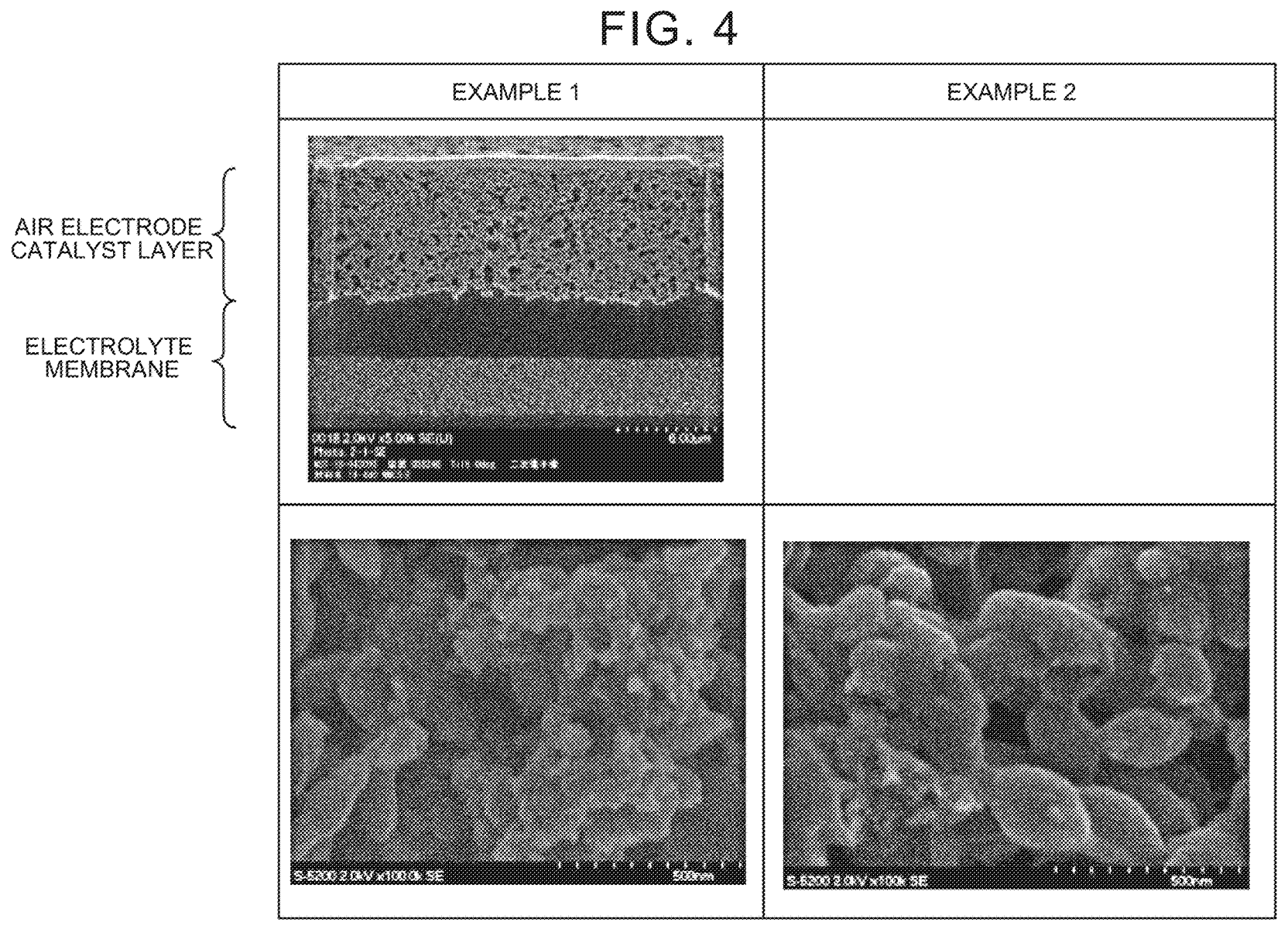
Figure 5:
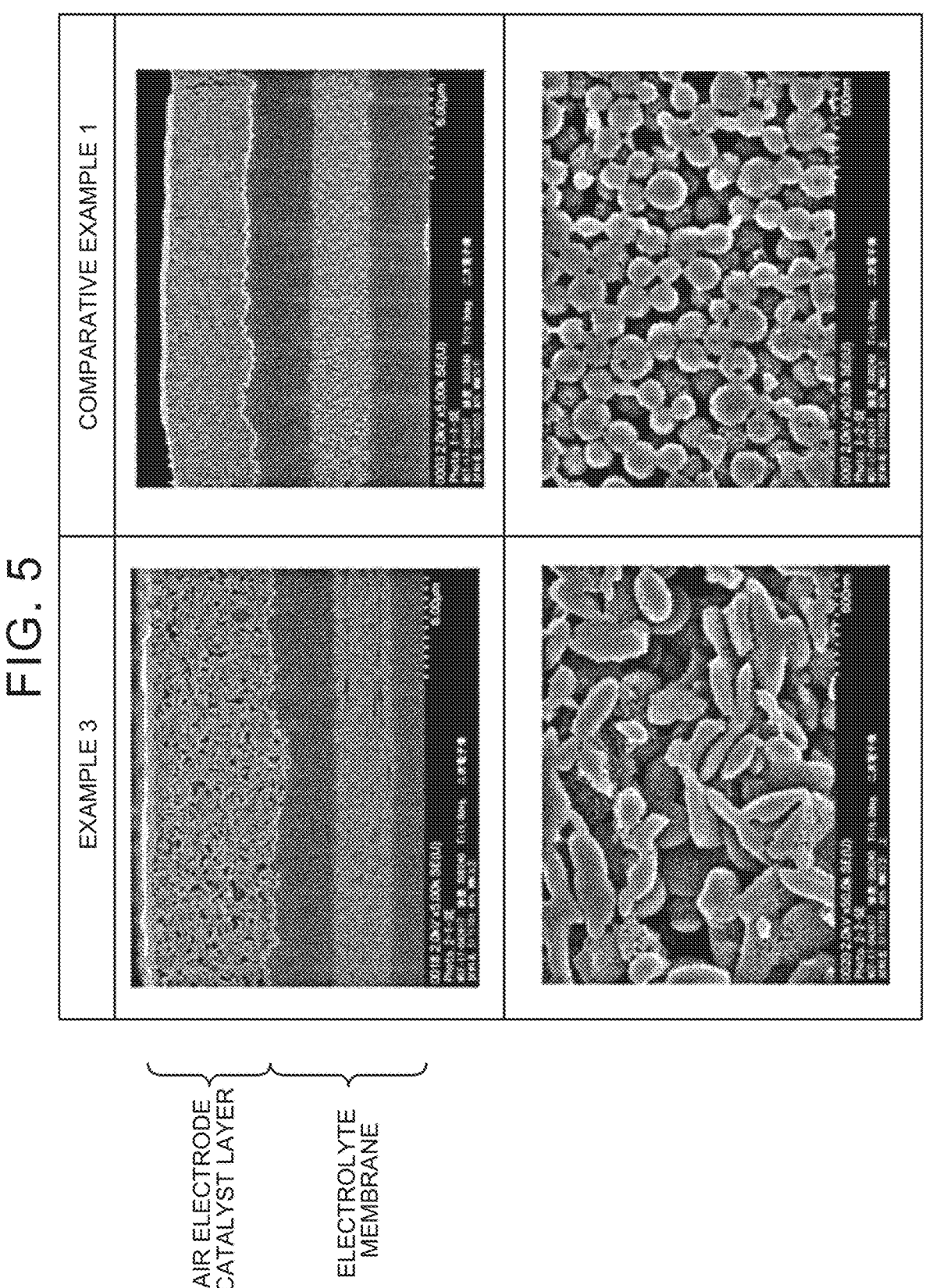
FIG. 5 shows SEM images of cross sections of MEAs obtained in Examples 3 and Comparative Example 1 (upper part) and enlarged SEM images of cross sections of air electrode catalyst layers of the MEAs (lower part)

FIG. 4 shows SEM images of cross sections of the MEAs obtained in Examples 1 and 2 (upper part) and enlarged SEM images of the cross sections of the air electrode catalyst layers of the MEAs (lower part). FIG. 5 shows SEM images of cross sections of the MEAs obtained in Example 3 and Comparative Example 1 (upper part) and enlarged SEM images of the cross sections of the air electrode catalyst layers of the MEAs (lower part). The following can be seen from FIGS. 4 and 5.

(1) Although the weight of Pt is the same, the thicknesses of the air electrode catalyst layers of the MEAs of Examples 1 to 3 are thicker than that of Comparative Example 1. This is because the tap densities of the mesoporous carbon used as the catalyst carrier are low. This provides the catalyst layers having many voids.

3.2.2. Power Generation Characteristics

Figure 6:
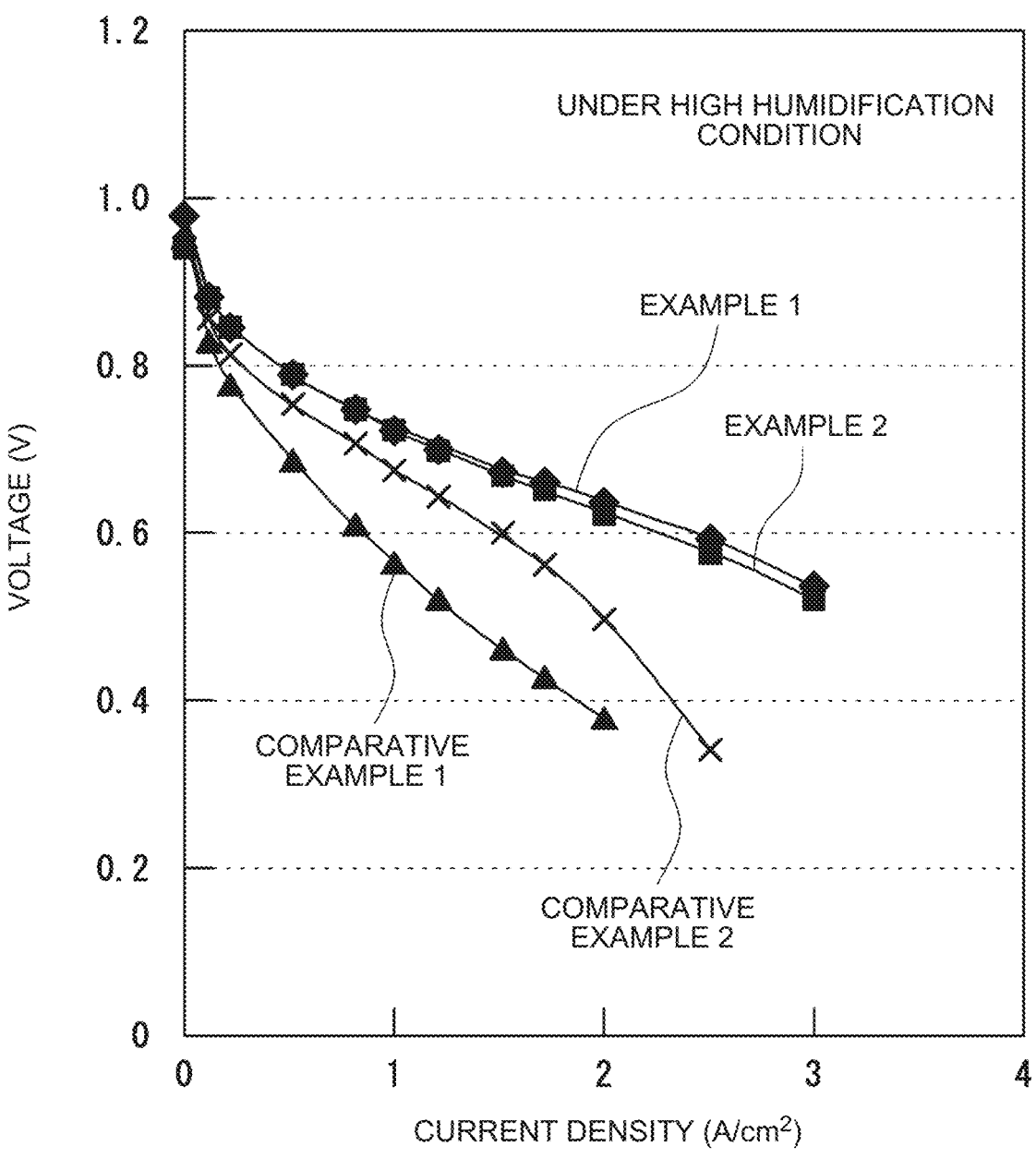
FIG. 6 shows current-voltage performance (IV performance) of fuel cells obtained in Examples 1 and 2 and Comparative Examples 1 and 2 under a high humidification condition (80% RH)

FIG. 6 shows the IV performance, under a high humidification condition (80% RH), of the fuel cells obtained in Examples 1 and 2 and Comparative Examples 1 and 2. FIG.

Figure 7:
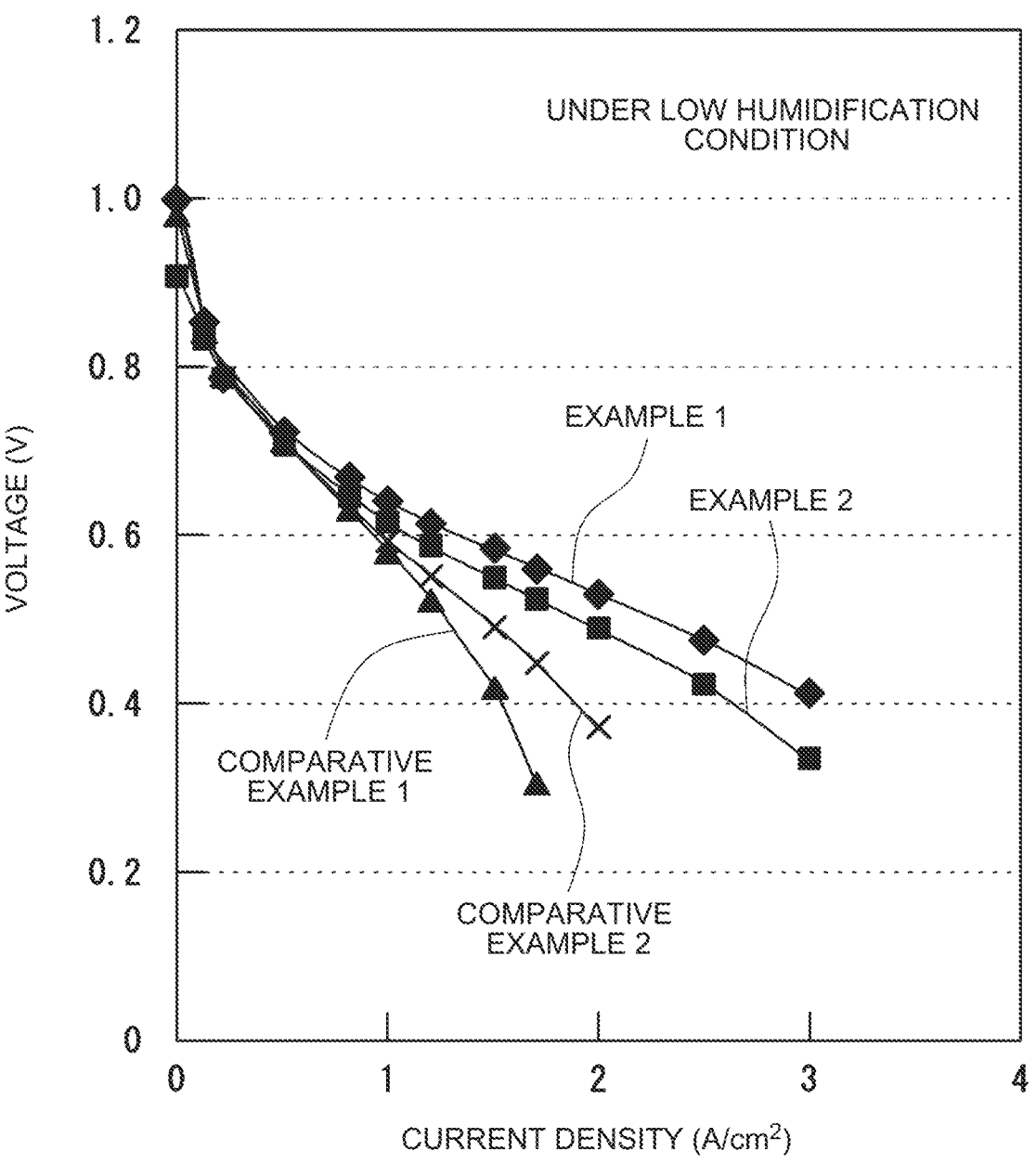
FIG. 7 shows IV performance of the fuel cells obtained in Examples 1 and 2 and Comparative Examples 1 and 2 under a low humidification condition (30% RH)

7 shows the IV performance, under a low humidification condition (30% RH), of the fuel cells obtained in Examples 1 and 2 and Comparative Examples 1 and 2. The following can be seen from FIGS. 6 and 7.

(1) The fuel cells of Examples 1 and 2 each obtained high IV performance under both the high humidification condition and the low humidification condition.

(2) The IV performance of the fuel cell of Comparative Example 1 is lower than those of Examples 1 and 2 under both the high humidification condition and the low humidification condition. The low IV performance under the high humidification conditions is considered to be due to flooding caused by excessively high tap density.

(3) The IV performance of the fuel cell of Comparative Example 2 is higher than that of Comparative Example 1 but is lower than those of Examples 1 and 2 under both the high humidification condition and the low humidification condition. This is considered to be because ionomers coated the catalyst and thus the catalyst performance deteriorated.

3.3. Graphitization Degree

Figures 8A, 8B:
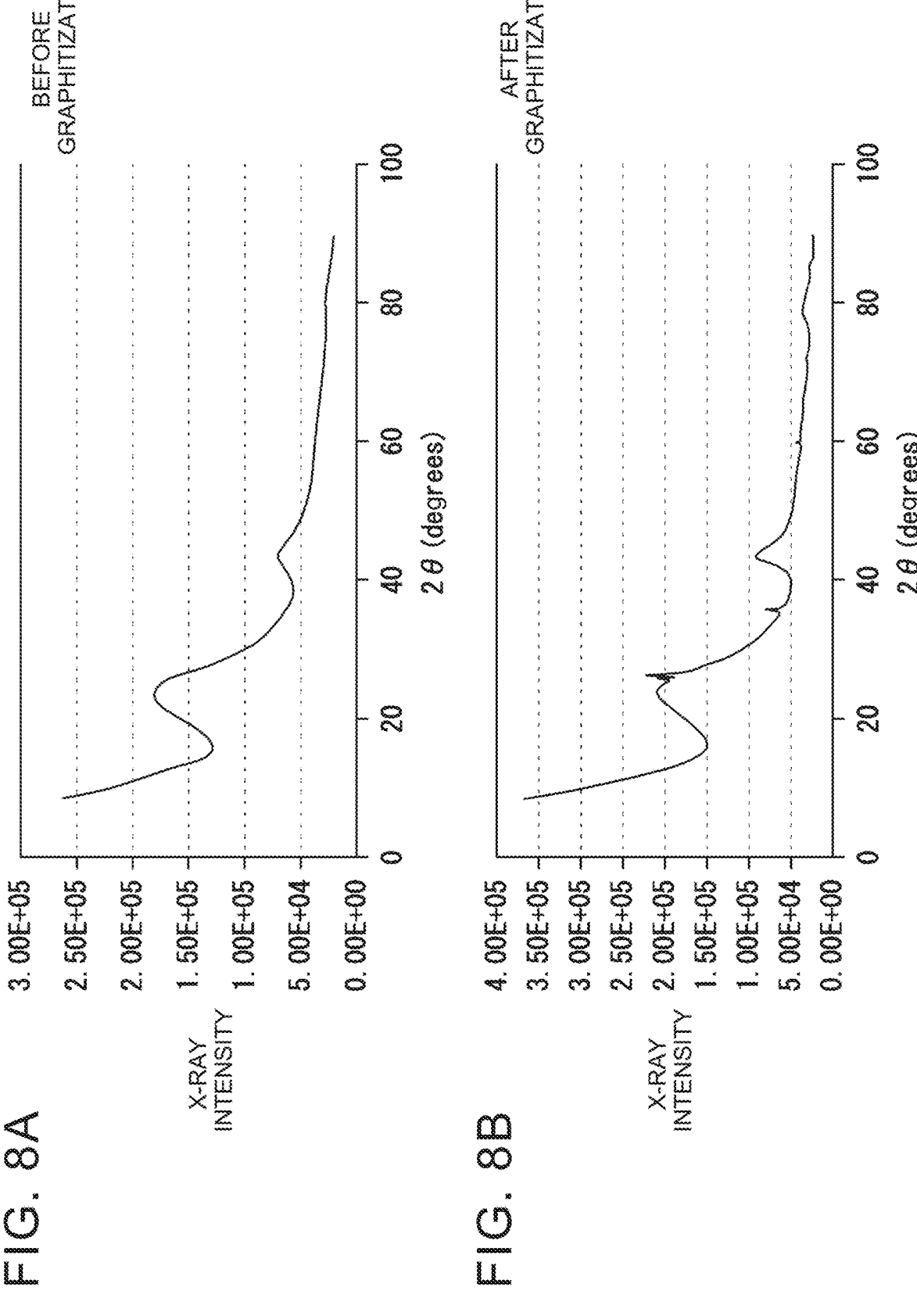
FIG. 8A shows an X-ray diffraction pattern of the mesoporous carbon (Example 1) before a graphitization treatment.
FIG. 8B shows an X-ray diffraction pattern of the mesoporous carbon (Example 1) after the graphitization treatment.

FIG. 8A shows an X-ray diffraction pattern of the mesoporous carbon (Example 1) before the graphitization treatment. FIG. 8B shows an X-ray diffraction pattern of the mesoporous carbon (Example 1) after the graphitization treatment. FIGS. 8A and 8B show that the crystallinity of the mesoporous carbon is improved by the graphitization treatment.

Although the embodiments of the present disclosure have been described in detail above, the present disclosure is not limited to the above embodiments, and various modifications can be made without departing from the scope of the present disclosure.

The mesoporous carbon according to the present disclosure can be used as a catalyst carrier for an air electrode catalyst layer or a catalyst carrier for a fuel electrode catalyst layer of a polymer electrolyte fuel cell.

What is claimed is:

1. Mesoporous carbon comprising a beaded structure in which primary particles with mesopores are linked, wherein:
   an average primary particle size of the mesoporous carbon is 7 nm or more and 250 nm or less;
   a pore diameter of the mesopores is 2 nm or more and 10 nm or less;
   an average thickness of pore walls of the mesopores is 3 nm or more and 15 nm or less;
   a pore volume of the mesoporous carbon is 0.2 mL/g or more and 3.0 mL/g or less; and
   a tap density of the mesoporous carbon is 0.03 $g/cm^3$ or more and 0.3 $g/cm^3$ or less.

2. The mesoporous carbon according to claim 1, wherein the average primary particle size is 10 nm or more and 250 nm or less.

3. The mesoporous carbon according to claim 1, wherein the average thickness of the pore walls is 3.5 nm or more and 10 nm or less.

4. The mesoporous carbon according to claim 1, wherein the pore volume is 0.5 mL/g or more and 2.5 mL/g or less.

5. The mesoporous carbon according to claim 1, wherein the tap density is 0.03 $g/cm^3$ or more and 0.2 $g/cm^3$ or less.

6. The mesoporous carbon according to claim 1, wherein the mesoporous carbon is obtained by performing a graphitization treatment at a temperature higher than 1500° C.

7. The mesoporous carbon according to claim 1, wherein a specific surface area of the mesoporous carbon is 800 $m^2/g$ or more.

8. The mesoporous carbon according to claim 1, wherein the primary particles have an aspect ratio of 1.1 to 3.

9. The mesoporous carbon according to claim 1, wherein the tap density is 0.08 $g/cm^3$ or more and 0.15 $g/cm^3$ or less.

10. An air electrode catalyst layer comprising:
   the mesoporous carbon according to claim 1 as a catalyst carrier.

* * * * *